(12) United States Patent
Chen et al.

(10) Patent No.: US 9,859,737 B2
(45) Date of Patent: Jan. 2, 2018

(54) METHOD AND APPARATUS FOR PERFORMING SYSTEM POWER MANAGEMENT IN ELECTRONIC DEVICE EQUIPPED WITH BATTERY

(71) Applicant: MEDIATEK INC., Hsin-Chu (TW)

(72) Inventors: Pi-Fen Chen, Hsinchu County (TW); Chih-Yuan Hsu, Hsinchu (TW); Hung-I Wang, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/084,488

(22) Filed: Mar. 30, 2016

(65) Prior Publication Data

US 2016/0211691 A1    Jul. 21, 2016

Related U.S. Application Data

(62) Division of application No. 13/610,909, filed on Sep. 12, 2012, now Pat. No. 9,327,321.

(Continued)

(51) Int. Cl.
*H02J 7/00* (2006.01)
*B08B 3/02* (2006.01)
(Continued)

(52) U.S. Cl.
CPC .......... *H02J 7/0068* (2013.01); *H02J 7/0081* (2013.01); *B08B 3/022* (2013.01); *B08B 13/00* (2013.01);
(Continued)

(58) Field of Classification Search
CPC .................. H02J 7/0081; H02J 7/0068; H02J 2007/0096; F26B 3/0923; F26B 3/08; B08B 3/022; B08B 13/00
See application file for complete search history.

(56) References Cited

U.S. PATENT DOCUMENTS

| | | | |
|---|---|---|---|
| 6,507,172 B2 * | 1/2003 | Sherman | G06F 1/26 320/128 |
| 6,683,440 B2 * | 1/2004 | Kawakami | G01R 31/361 320/133 |
| 6,741,066 B1 * | 5/2004 | Densham | H02J 7/02 320/145 |
| 6,765,365 B2 | 7/2004 | Kim | |
| 6,836,095 B2 * | 12/2004 | Fogg | G01R 31/3606 320/128 |

(Continued)

FOREIGN PATENT DOCUMENTS

CN     1741345 A     3/2006
CN     101478171 B   12/2010
(Continued)

*Primary Examiner* — Naum B Levin
(74) *Attorney, Agent, or Firm* — Wolf, Greenfield & Sacks, P.C.

(57) ABSTRACT

A method and an apparatus for performing charging port detection control are provided, where the method is applied to an electronic device, a communication port of the electronic device has a functionality of obtaining power from an external power source for the electronic device, and a power path switching unit of the electronic device is arranged to control electrical connection between a system within the electronic device and a battery of the electronic device. The method may include the steps of: performing charging port detection; and control operation(s) according to the charging port detection. For example, the method may include: controlling the power path switching unit to have different configuration according to the charging port detection in order to charge the battery with different charging profiles; and detecting the system voltage level during charging for switching from the constant current mode to the constant voltage mode.

13 Claims, 6 Drawing Sheets

Related U.S. Application Data (60) Provisional application No. 61/557,551, filed on Nov. 9, 2011.

(51) Int. Cl.
  *B08B 13/00* (2006.01)
  *F26B 3/08* (2006.01)
  *F26B 3/092* (2006.01)

(52) U.S. Cl.
  CPC .............. *F26B 3/08* (2013.01); *F26B 3/0923* (2013.01); *H02J 2007/0096* (2013.01)

(56) References Cited

U.S. PATENT DOCUMENTS

| | | | | |
|---|---|---|---|---|
| 6,946,817 B2* | 9/2005 | Fischer | | H02J 7/0027 |
| | | | | 320/107 |
| 7,471,059 B2 | 12/2008 | Bayne | | |
| 7,474,079 B2* | 1/2009 | Hashimoto | | H02J 7/022 |
| | | | | 320/138 |
| 7,502,949 B2* | 3/2009 | Park | | G06F 1/263 |
| | | | | 320/110 |
| 7,548,041 B2* | 6/2009 | Zemke | | H02J 7/0068 |
| | | | | 320/128 |
| 7,560,898 B1* | 7/2009 | Kranzen | | H02J 7/0055 |
| | | | | 320/107 |
| 7,615,965 B2 | 11/2009 | Popescu-Stanesti | | |
| 7,663,346 B2 | 2/2010 | Wang | | |
| 7,679,316 B2* | 3/2010 | Guthrie | | G06F 1/263 |
| | | | | 320/107 |
| 7,710,079 B2* | 5/2010 | Martin | | H02J 7/0068 |
| | | | | 320/145 |
| 7,834,591 B2 | 11/2010 | Hussain | | |
| 8,030,900 B2 | 10/2011 | Hussain | | |
| 8,111,035 B2* | 2/2012 | Nishino | | H02J 7/0075 |
| | | | | 307/46 |
| 8,248,032 B2* | 8/2012 | Ozeki | | H02J 7/0018 |
| | | | | 320/124 |
| 8,289,000 B2* | 10/2012 | Nishida | | H01M 10/44 |
| | | | | 320/145 |
| 8,482,263 B2* | 7/2013 | Barrade | | H02J 7/0054 |
| | | | | 320/103 |
| 8,606,201 B2* | 12/2013 | Fujii | | H04W 52/0254 |
| | | | | 455/127.1 |
| 8,671,291 B2* | 3/2014 | Ballantyne | | G06F 1/266 |
| | | | | 713/300 |
| 8,880,909 B2* | 11/2014 | Tom | | G06F 1/266 |
| | | | | 370/278 |
| 8,884,589 B2 | 11/2014 | Knowlton | | |
| 8,890,469 B2* | 11/2014 | Picard | | H01M 10/48 |
| | | | | 320/107 |
| 9,018,921 B2* | 4/2015 | Gurlahosur | | H02J 7/0081 |
| | | | | 320/134 |
| 9,142,982 B2* | 9/2015 | Chen | | H02J 7/0021 |
| 2005/0001590 A1 | 1/2005 | Bayne | | |
| 2005/0001592 A1* | 1/2005 | Bayne | | G06F 1/26 |
| | | | | 320/132 |
| 2005/0174094 A1* | 8/2005 | Purdy | | H02J 7/0052 |
| | | | | 320/134 |
| 2007/0029975 A1* | 2/2007 | Martin | | H02J 7/0068 |
| | | | | 320/134 |
| 2008/0012524 A1* | 1/2008 | Yu | | H01M 10/44 |
| | | | | 320/103 |
| 2008/0238357 A1 | 10/2008 | Bourilkov | | |
| 2009/0066293 A1* | 3/2009 | Miyanaga | | G01R 19/16538 |
| | | | | 320/134 |
| 2009/0189569 A1 | 7/2009 | Hsu | | |
| 2009/0322287 A1* | 12/2009 | Ozeki | | H02J 7/0018 |
| | | | | 320/145 |
| 2010/0070659 A1* | 3/2010 | Ma | | G06F 13/385 |
| | | | | 710/14 |
| 2010/0205472 A1 | 8/2010 | Tupman | | |
| 2010/0207571 A1* | 8/2010 | English | | H01M 10/0525 |
| | | | | 320/101 |
| 2010/0235546 A1 | 9/2010 | Terlizzi | | |
| 2010/0270862 A1 | 10/2010 | Miyanaga | | |
| 2011/0279095 A1* | 11/2011 | Hong | | G06F 13/385 |
| | | | | 320/164 |
| 2012/0194130 A1* | 8/2012 | Patino | | H01M 10/441 |
| | | | | 320/112 |
| 2013/0221906 A1* | 8/2013 | Imblum | | H02J 7/0073 |
| | | | | 320/107 |

FOREIGN PATENT DOCUMENTS

| | | |
|---|---|---|
| CN | 101989749 B | 3/2014 |
| TW | 200740005 | 10/2007 |
| TW | 201030512 | 8/2010 |

* cited by examiner

METHOD AND APPARATUS FOR PERFORMING SYSTEM POWER MANAGEMENT IN ELECTRONIC DEVICE EQUIPPED WITH BATTERY

CROSS REFERENCE TO RELATED APPLICATION

This application is a divisional application of U.S. Non-provisional application Ser. No. 13/610,909, now U.S. Pat. No. 9,327,321 B2, which was filed on Sep. 12, 2012 and is included herein by reference. The U.S. Non-provisional application Ser. No. 13/610,909 claims the benefit of U.S. Provisional Application No. 61/557,551, which was filed on Nov. 9, 2011.

BACKGROUND

The present invention relates to a charger module within an electronic device, and more particularly, to a method for performing system power management, and to an associated apparatus.

A portable electronic device equipped with batteries (e.g., a multifunctional mobile phone, a personal digital assistant (PDA), a tablet, etc) can be very convenient to a user. According to the related art, the portable electronic device may be designed to have a Universal Serial Bus (USB) port, and the user can electrically connect the portable electronic device to an electronic device complying with USB standards through the USB port when needed, or charge the portable electronic device (more particularly, the battery thereof) with a power source temporarily connected to the USB port, where the power source can be a USB charger, or can be a personal computer (PC) since the USB port of the portable electronic device can obtain power from the power source through the USB port. Based upon the conventional power management methods in the related art, in a situation where the system power consumption of the portable electronic device is increased due to design changes (e.g., enhanced hardware speed/performance and the enlarged screen size), some problems may occur. For example, switching the system power input of the portable electronic device according to the related art allows the user to use the portable electronic device when the battery is deeply discharged or even the battery is absent. Furthermore, the system power may be perturbed during the power source switching. In another example, the portable electronic device may suffer from deficient/unstable power when the portable electronic device is merely powered by a USB-complaint standard downstream port or a USB On-The-Go (OTG) device without using the battery. Thus, a novel method is required for enhancing system power management of an electronic device.

SUMMARY

It is therefore an objective of the claimed invention to provide a method for performing system power management, and to provide an associated apparatus, in order to solve the above-mentioned problems.

An exemplary embodiment of a method for performing system power management is provided, where the method is applied to an electronic device, a communication port of the electronic device has a functionality of obtaining power from an external power source for the electronic device, and a power path switching unit of the electronic device is arranged to control electrical connection between a system within the electronic device and a battery of the electronic device. The method comprises the steps of: performing charging port detection on the communication port; controlling the power path switching unit to charge the battery and detecting whether a voltage level of a system power signal at a power input terminal of the system reaches a predetermined threshold value in a constant current mode during charging the battery; and when it is detected that the voltage level reaches the predetermined threshold value in the constant current mode during charging the battery, switching from the constant current mode to a constant voltage mode.

An exemplary embodiment of an apparatus for performing system power management is provided, where the apparatus comprises at least one portion of an electronic device, a communication port of the electronic device has a functionality of obtaining power from an external power source for the electronic device, and a power path switching unit of the electronic device is arranged to control electrical connection between a system within the electronic device and a battery of the electronic device. The apparatus comprises a charging port detection circuit, and further comprises a charger module, electrically connected to the charging port detection circuit. The charging port detection circuit is arranged to perform charging port detection on the communication port. In addition, the charger module controls the power path switching unit to charge the battery and detects whether a voltage level of a system power at a power input terminal of the system reaches a predetermined threshold value in a constant current mode during charging the battery. When it is detected that the voltage level reaches the predetermined threshold value in the constant current mode during charging the battery, the charger module switches from the constant current mode to a constant voltage mode.

An exemplary embodiment of a method for performing system power management is provided, where the method is applied to an electronic device, a communication port of the electronic device has a functionality of obtaining power from an external power source for the electronic device, and a power path switching unit of the electronic device is arranged to control electrical connection between a system within the electronic device and a battery of the electronic device. The method comprises the steps of: performing charging port detection on the communication port to determine whether the external power source belongs to a predetermined type of power sources; and when it is detected that the external power source belongs to the predetermined type of power sources, controlling the power path switching unit to make the output voltage of the battery or the system power to meet a first charging profile.

An exemplary embodiment of an apparatus for performing system power management is provided, where the apparatus comprises at least one portion of an electronic device, a communication port of the electronic device has a functionality of obtaining power from an external power source for the electronic device, and a power path switching unit of the electronic device is arranged to control electrical connection between a system within the electronic device and a battery of the electronic device. The apparatus comprises a charging port detection circuit, and further comprises a charger module, electrically connected to the charging port detection circuit. The charging port detection circuit is arranged to perform charging port detection on the communication port to determine whether the external power source belongs to a predetermined type of power sources. In addition, when it is detected that the external power source belongs to the predetermined type of power sources, the charger module controls the power path switching unit to make the output voltage of the battery or the system power to meet a first charging profile.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
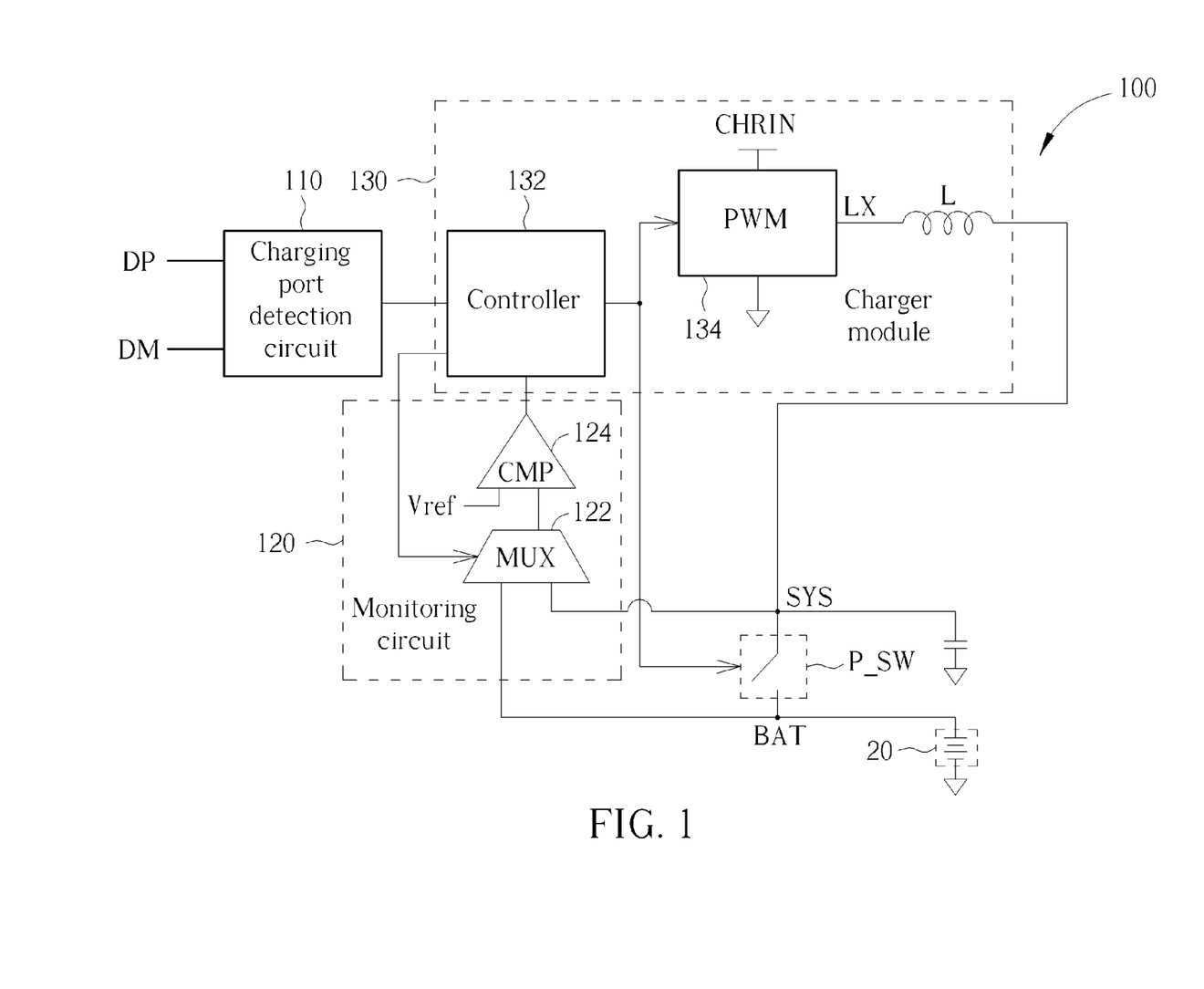
FIG. 1 is a diagram of an apparatus for performing system power management according to a first embodiment of the present invention.

Please refer to FIG. 1, which illustrates a diagram of an apparatus 100 for performing system power management according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as a tablet, and a personal computer such as a laptop computer or desktop computer.

According to the embodiment shown in FIG. 1, a communication port of the electronic device has a functionality of obtaining power from an external power source for the electronic device, where the communication port typically comprises at least one power terminal regarding the functionality of obtaining power from the external power source for the electronic device. For example, the communication port can be a Universal Serial Bus (USB) port whose connector, such as a USB connector (not shown), may comprise a plurality of terminals VBUS, D−, D+ and GND, where the terminal VBUS can be regarded as the aforementioned at least one power terminal, the terminals D− and D+ can be regarded as data terminals (or communication terminals) of the aforementioned communication port such as the USB port, and the terminal GND can be regarded as a ground terminal. According to this embodiment, the data terminals DP and DN shown in FIG. 1 can be electrically connected to the data terminals D+ and D− of the USB connector, respectively, and therefore can be regarded as the data terminals D+ and D− of the USB connector in this situation, respectively. As shown in FIG. 1, the apparatus 100 comprises a charging port detection circuit 110, a monitoring circuit 120, and a charger module 130. For example, the monitoring circuit 120 of this embodiment may comprise a multiplexer 122 and a comparator 124 (labeled "MUX" and "CMP", respectively, for brevity), and the charger module 130 of this embodiment may comprise a controller 132, a pulse width modulator 134 (labeled "PWM", for brevity), and an inductor L. This is the switching type example. The charger module is not limited to be switching type. It can be linear or pulsed type, too.

In this embodiment, the charging port detection circuit 110 is arranged to perform charging port detection, and the monitoring circuit 120 is arranged to selectively monitor the voltage level VSYS of the system power from the system terminal SYS of the charger module 130 or monitor the battery voltage level on the battery terminal BAT of the battery 20. Please note that monitoring the voltage level VSYS or monitoring the voltage level VBAT forms a voltage regulation loop. The current information flowing into the battery 20 or output from the charger module can also feedback to the comparator 124 via the multiplexer 122 to form a current regulation loop, which is not shown in FIG. 1 for simplification. The monitoring circuit 120 shown in FIG. 1 is for illustrative only and not a limitation. Please further note that monitoring the voltage level VSYS and monitoring the voltage level VBAT are different things since the power path between the system terminal SYS and the battery terminal BAT may be selectively disabled, where some details regarding the power path will be described later. For example, the monitoring circuit 120 may be arranged to selectively monitor the voltage level VSYS. For example, the monitoring circuit 120 may be arranged to selectively monitor the voltage level VBAT. More particularly, under control of the controller 132, the multiplexer 122 is capable of multiplexing one of the voltage level VSYS on the system terminal SYS and the output voltage level VBAT on the battery terminal BAT, for being input into the comparator 124. When utilizing the multiplexer 122 to select one of the voltage level VSYS and the output voltage level VBAT, the monitoring circuit 120 can monitor the selected voltage level (e.g. the voltage level VSYS or the output voltage level VBAT) by utilizing the comparator 124 to compare the selected voltage level (e.g. the voltage level VSYS or the output voltage level VBAT) with a predetermined reference voltage level Vref, where under control of the controller 132, the monitoring circuit 120 can select the predetermined reference voltage level Vref from a set of predetermined reference voltage levels {Vref} when needed. In addition, the charger module 130 is capable of providing power to the system terminal SYS coupling to a system circuit (not shown in the figure) within the electronic device and charging at least one battery of the electronic device, such as the battery 20 shown in FIG. 1, where the system circuit mentioned above can be referred to as the system, for brevity.

Please note that the combination of the pulse width modulator 134 and the inductor L can be regarded as a regulator that is capable of determining the voltage level VSYS of the system power output from the system terminal SYS of the charger module 130 under control of the controller 132. According to this embodiment, the controller 132 is arranged to control operations of the charger module 130, such as the pulse width modulation performed by the pulse width modulator 134. The pulse width modulator 134 is capable of outputting a pulse width modulated signal having a specific duty cycle at the terminal LX, where the voltage level VSYS corresponds to the specific duty cycle, and the specific duty cycle is determined by the controller 132. Thus, the charger module 130 is capable of regulating the input received from the charger input terminal CHRIN, which is for example electrically connected to the power terminal VBUS of the USB connector mentioned above. For example, in a situation where the external power source is a USB charger such as an alternating current (AC)-to-direct current (DC) adaptor having a USB cable for outputting power, the output power of the AC-to-DC adaptor is received through the power terminal VBUS and is input into the charger module 130 through the charger input terminal CHRIN. In another example, in a situation where the external power source is a personal computer (PC) with a USB cable being temporarily connected between the PC and the electronic device, the output power of the PC is received through the power terminal VBUS and is input into the charger module 130 through the charger input terminal CHRIN.

As shown in FIG. 1, a power path switching unit P_SW is installed on the power path between the system terminal SYS of the charger module 130 and the battery terminal BAT of the battery 20, where the power path switching unit P_SW of the electronic device is arranged to control electrical connection between the system within the electronic device and the battery 20 of the electronic device. Typically, the system is electrically connected to the system terminal SYS, for selectively being powered by the charger module 130 or the battery 20 with the aid of the power path switching unit P_SW controlled by the controller 132. According to this embodiment, in a situation where the controller 132 turns on (i.e. close) the power path switching unit P_SW to enable the aforementioned power path, the charger module 130 is capable of charging the battery 20. This is for illustrative purposes only, and is not meant to be a limitation of the present invention. The apparatus 100 can enable the power path to perform other operations. For example, in a situation where the controller 132 turns on the power path switching unit P_SW to enable the aforementioned power path, the system can be powered by the battery 20. In addition, in a situation where the controller 132 turns off (i.e. open) the power path switching unit P_SW to disable the aforementioned power path, the charger module 130 is capable of providing the system with the system power directly when the battery 20 is in a low battery condition. More particularly, when the battery 20 is in the low battery condition, the controller 132 may turn off the power path switching unit P_SW to disconnect the battery 20 from the system terminal SYS of the charger module 130, in order to prevent the voltage level VSYS of the system power output from the system terminal SYS from being pulled down by the battery 20 in the low battery condition.

Typically, the charger module 130 may comply with Battery Charging (BC) Specifications such as Revision 1.1 or Revision 1.2 thereof, i.e. the so-called BC 1.1 or BC 1.2, for USB-compliant devices, where at least one portion of the aforementioned BC 1.1 and BC 1.2 defines the mechanisms that allow devices to distinguish the type of the USB port, and typically, it can be achieved by a detection sequence on D+ and D− data lines (i.e. the data lines respectively corresponding to the data terminals D+ and D−). For example, regarding aforementioned charging port detection, the charging port detection circuit 110 may comprise some hardware circuits for generating the detection sequences.

Figure 2:
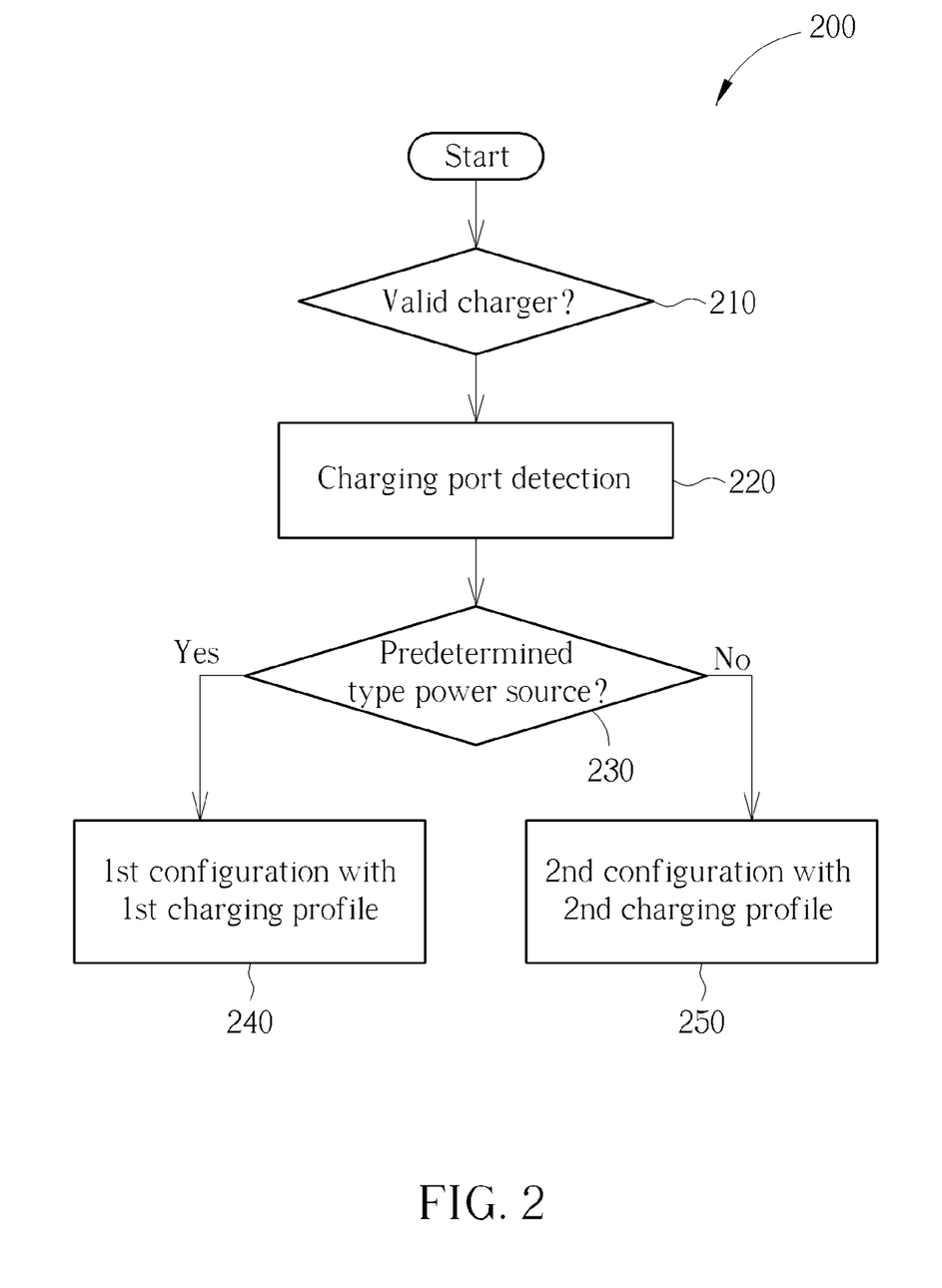
FIG. 2 illustrates a flowchart of a method for performing system power management according to an embodiment of the present invention.

Please refer to FIG. 2 in combination with FIG. 1. FIG. 2 illustrates a working flow of a method 200 for performing system power management according to an embodiment of the present invention. The method shown in FIG. 2 can be applied to the apparatus 100 shown in FIG. 1. The method is described as follows.

In Step 210, the charger module 130 (more particularly, the controller 132) detects whether there is a valid charger electrically connected to the USB connector mentioned above. In practice, the controller 132 is capable of detecting the input received from the charger input terminal CHRIN by using a detection circuit therein (not shown), where the detection circuit can be a comparator arranged to detect a voltage variation (or a voltage increment) of the input received from the charger input terminal CHRIN. For example, in a situation where an external power source is electrically connected to the USB connector, the controller 132 may detect the existence of the external power source by using this detection circuit. In another example, in a situation where a first end of a USB cable is plugged into the USB connector with the other end of this USB cable being unplugged, the controller 132 will not detect a valid charger. When it is detected that there is a valid charger electrically connected to the USB connector, Step 220 is entered; otherwise, Step 210 is re-entered.

In Step 220, the charging port detection circuit 120 performs the aforementioned charging port detection, where the BC 1.1 or BC 1.2 charging port detection can be taken as an example of the charging port detection.

In Step 230, based upon the detection result of the charging port detection mentioned in Step 220, the controller 132 determines whether the external power source is a predetermined type power source (more particularly, determines whether the external power source belongs to a predetermined type of power sources). In one embodiment, the determination is made according to the charging capability that the external power source can provide, such as a current level that the external power source is capable of providing. When it is detected that the external power source has a weak charging capability (more particularly, an insufficient current rating, for example, in a situation where the system circuit needs an input current level that is greater than 500 milliampere (mA) to sustain the system load and the external power source is a USB-complaint standard downstream port or a USB On-The-Go (OTG) device), Step 240 is entered; otherwise, the external power source has a strong charging capability (more particularly, a sufficient current rating, for example, in a situation where the system circuit needs an input current level that is greater than 500 mA to sustain the system load and the external power source is an AC-to-DC adaptor or a USB device other than the above-mentioned USB-complaint standard downstream port or USB OTG device), Step 250 is entered. Please note that since a skilled person should easily understand how to accomplish the above-mentioned charging port detection (or charger type detection), the detailed description is omitted for brevity.

Figure 7:
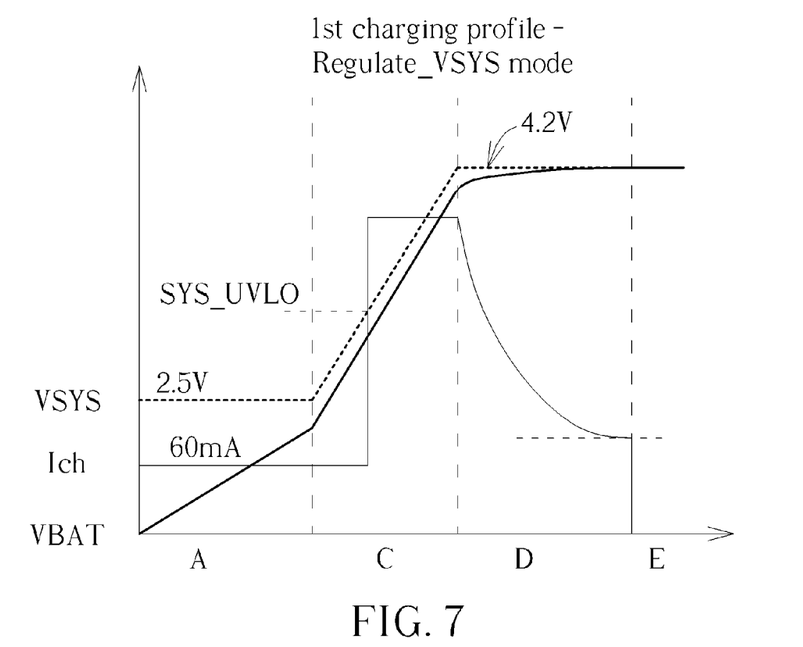
FIG. 7 illustrates a predetermined charging profile involved with the method shown in FIG. 2 and FIG. 3 according to an embodiment of the present invention.
Figure 8:
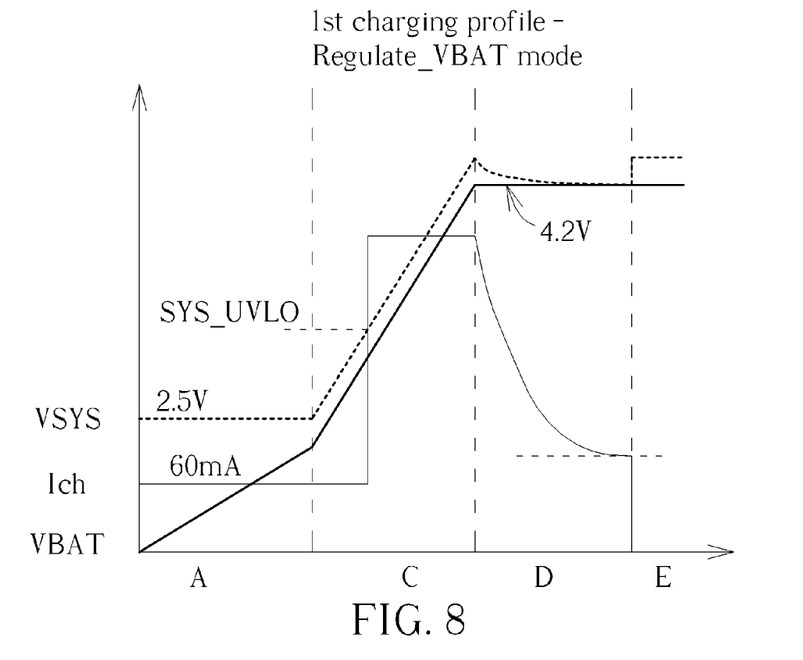
FIG. 8 illustrates a predetermined charging profile involved with the method shown in FIG. 2 according to another embodiment of the present invention.

In Step 240, the power path switching unit P_SW is controlled to have a first configuration such that the charger module 130 charges the battery 20 according to a first charging profile (e.g. one of the predetermined charging profiles respectively shown in FIG. 7 and FIG. 8). As a result, the I-V curve (i.e. the relationship of the charging current and the output voltage) of the battery 20 or the system power meets the first charging profile.

Figure 5:
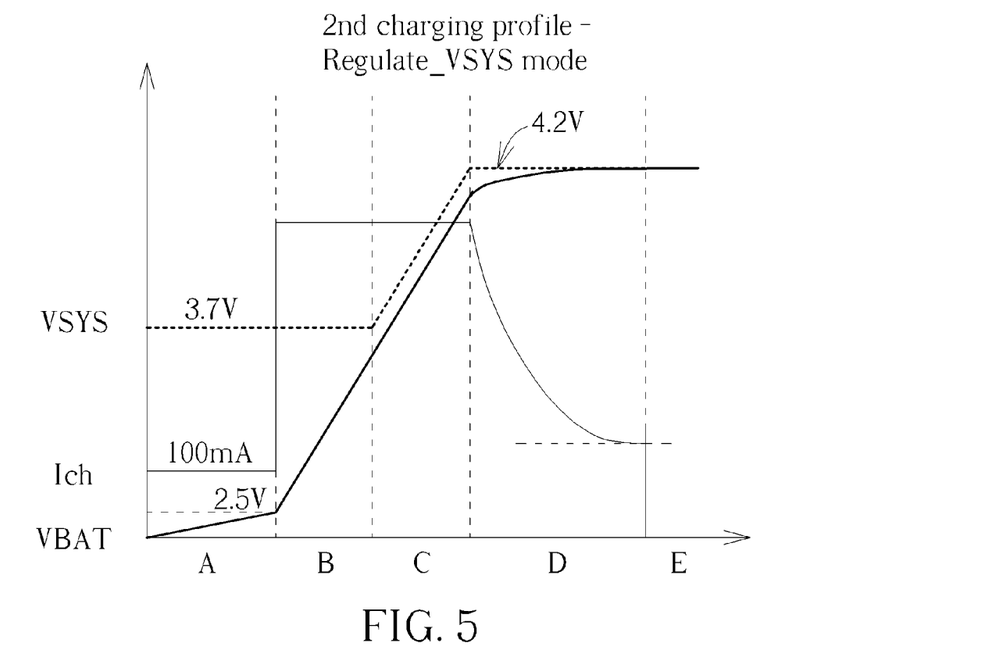
FIG. 5 illustrates a predetermined charging profile involved with the method shown in FIG. 2 and FIG. 4 according to an embodiment of the present invention.
Figure 6:
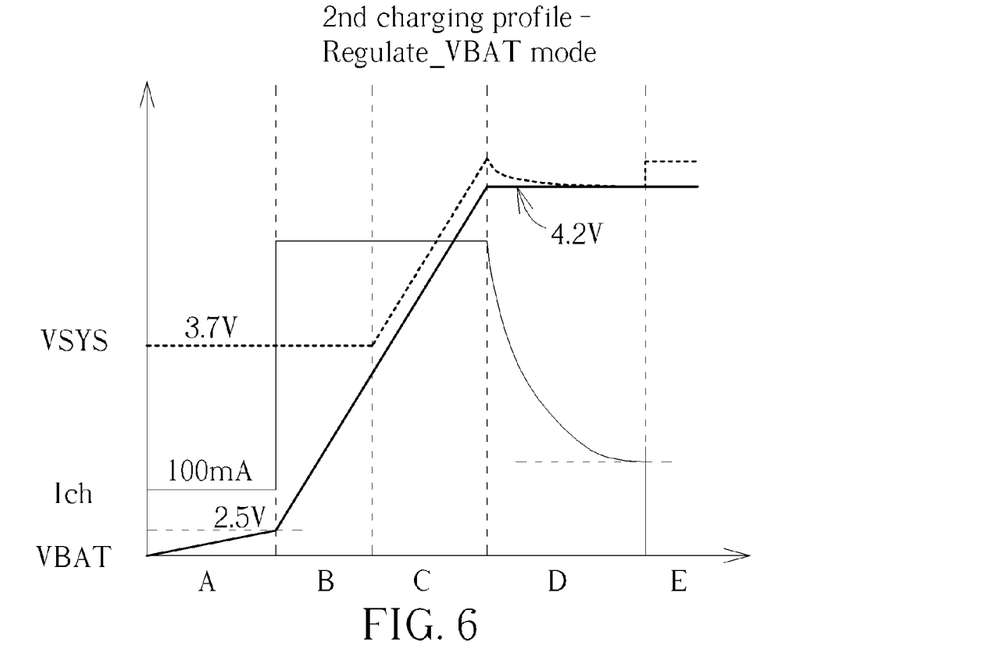
FIG. 6 illustrates a predetermined charging profile involved with the method shown in FIG. 2 according to another embodiment of the present invention.

In Step 250, the power path switching unit P_SW is controlled to have a second configuration such that the charger module 130 charges the battery 20 according to a second charging profile (e.g. one of the predetermined charging profiles respectively shown in FIG. 5 and FIG. 6). As a result, the I-V curve (i.e. the relationship of the charging current and the output voltage) of the battery 20 or the system power meets the second charging profile.

Figure 3:
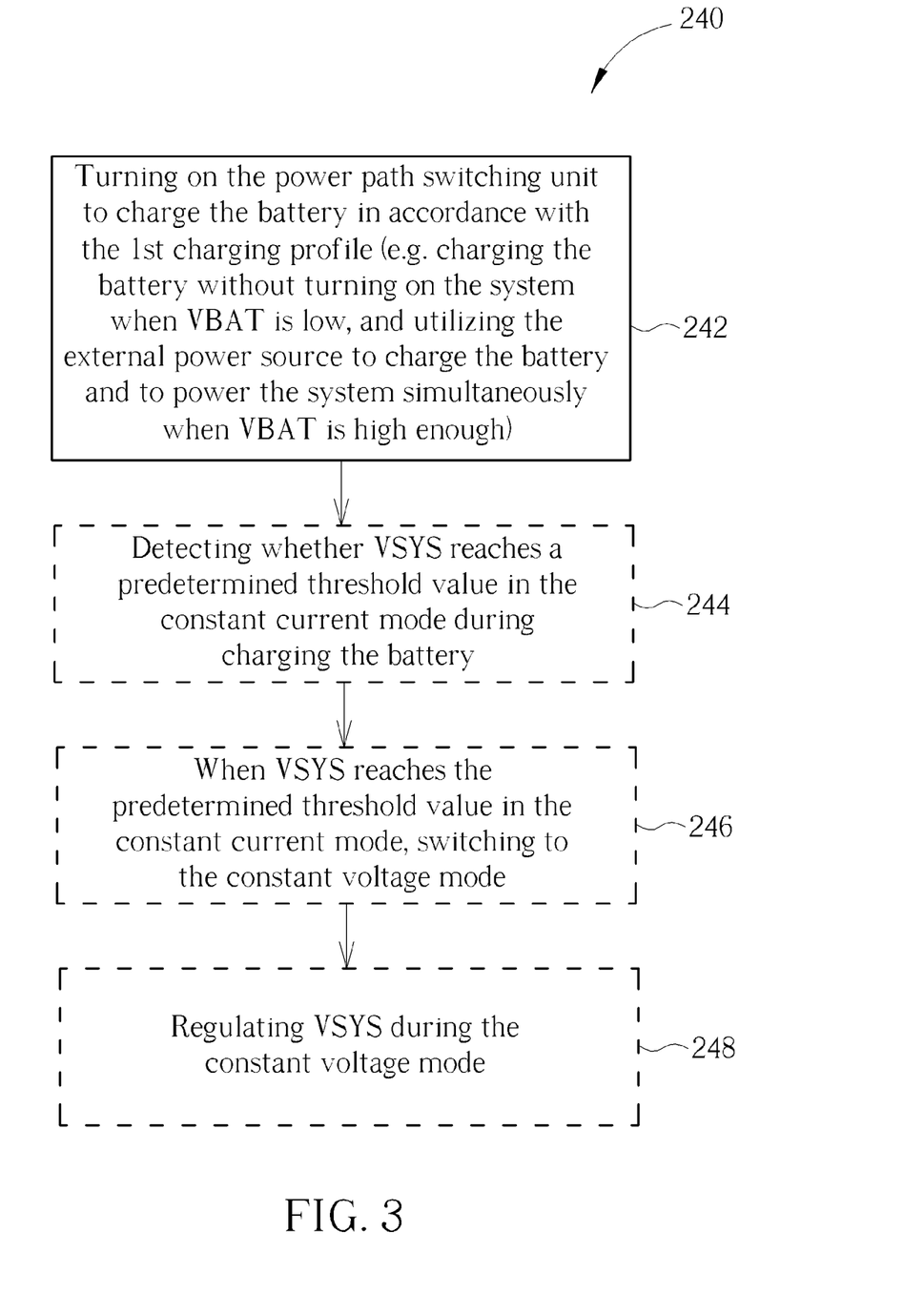
FIG. 3 illustrates a flowchart of a method for performing Step 240 shown in FIG. 2 according to an embodiment of the present invention.

FIG. 3 illustrates a flowchart of Step 240 shown in FIG. 2 according to an embodiment of the present invention. Since the external power source may not be capable of providing sufficient current (for example, the maximum current that the USB-complaint standard downstream port and the USB OTG device can provide is 500 mA and 100 mA, respectively) to sustain the operation of the system of the electronic device, it may cause instability of the system if the system is powered by the external power source solely without the aid of the battery. Therefore, the charging profile proposed in this embodiment first charges the battery without turning on the system when the battery voltage VBAT is low, and allows the system to be enabled when the battery voltage VBAT is high enough. The power received from the charger input terminal CHRIN then supplies the system and charges the battery simultaneously. The method is described as follows.

In Step 242, the charger module 130 (more particularly, the controller 132) turns on the power path switching unit P_SW to charge the battery 20 with the power received from the charger input terminal CHRIN when the battery voltage VBAT is low. Meanwhile, the system voltage VSYS is temporarily regulated to be within a predetermined voltage range (e.g. to be less than 3.2 V) to prevent the system from being turned on during this initial phase of charging the battery 20. When the battery voltage VBAT is high enough (e.g. reaches 3.2V), the system turns on, and the output of the regulator (e.g. the system power signal) is utilized to charge the battery 20 and to power the system simultaneously. In this way, even the system requires a large current which is over the maximum current that the weak external power source can provide, the apparatus 100 can enter a battery supplement mode to prevent the system from being shut down abruptly and keep the operations stable.

The charger module 130 (more particularly, the controller 132) may detect whether the output voltage level VBAT of the battery 20 is low (i.e. less than a predetermined threshold value) with the aid of the monitoring circuit 120. When it is detected that the external power source belongs to the predetermined type of power sources and that the output voltage level of the battery is less than the predetermined threshold value, the charger module 130 (more particularly, the controller 132) controls the power path switching unit P_SW to charge the battery 20. The power path switching unit P_SW may be implemented by transistors, and the controller 132 may fully or partially turns on the transistors of the power path switching unit P_SW to charge the battery of the power path switching unit P_SW to charge the battery 20. For example, the system voltage VSYS may be given a predetermined voltage level (e.g. 2.5V) which is less than the power-on voltage of the system by the charger module 130, and the partially turned-on transistors work as a low drop out (LDO) circuit to provide current to the battery 20 by converting the system voltage VSYS. Or, the fully turned-on transistors forma direct path that connecting the system power terminal SYS to the battery output terminal BAT, making the system voltage VSYS and the battery output voltage VBAT rise uniformly when the battery 20 is charged by the charger module 130.

The controller 132 may further controls the monitoring circuit 120 to detect whether the voltage level VSYS of the system power reaches a predetermined threshold value Vth (e.g. 4.2 Volts (V)) in the constant current mode during charging the battery 20 (Step 244). The multiplexer 122 of the monitoring circuit 120 may select and pass the system voltage VSYS to the comparator 124.

In Step 246, when the comparator 124 detects that the voltage level VSYS reaches the predetermined threshold value Vth (e.g. 4.2 V), the charger module 130 switches from the constant current mode to the constant voltage mode, and in Step 248, the charger module 130 regulates the voltage level VSYS to be at the predetermined threshold value Vth during the constant voltage mode for preventing the voltage level VSYS from exceeding the predetermined threshold value Vth during charging the battery 20. The predetermined threshold Vth represents a transition voltage level that the charger module 130 switches from the constant current mode to the constant voltage mode, and is generally depending on the battery characteristics. According to this embodiment, at the moment of switching from the constant current mode to the constant voltage mode, the system power output from the system terminal SYS of the charger module 130 is arranged to charge the battery 20 and to power the system simultaneously since the power path switching unit P_SW is turned on. In other words, the system power management method proposed in this embodiment detects and regulates the system voltage VSYS rather than the battery output voltage VBAT. As the power path switching unit P_SW contributes a voltage drop on the power path, the present method can effectively keep the power level at the system power terminal SYS under a safe region, thereby protecting the system coupled to the system power terminal SYS from overshooting.

Figure 4:
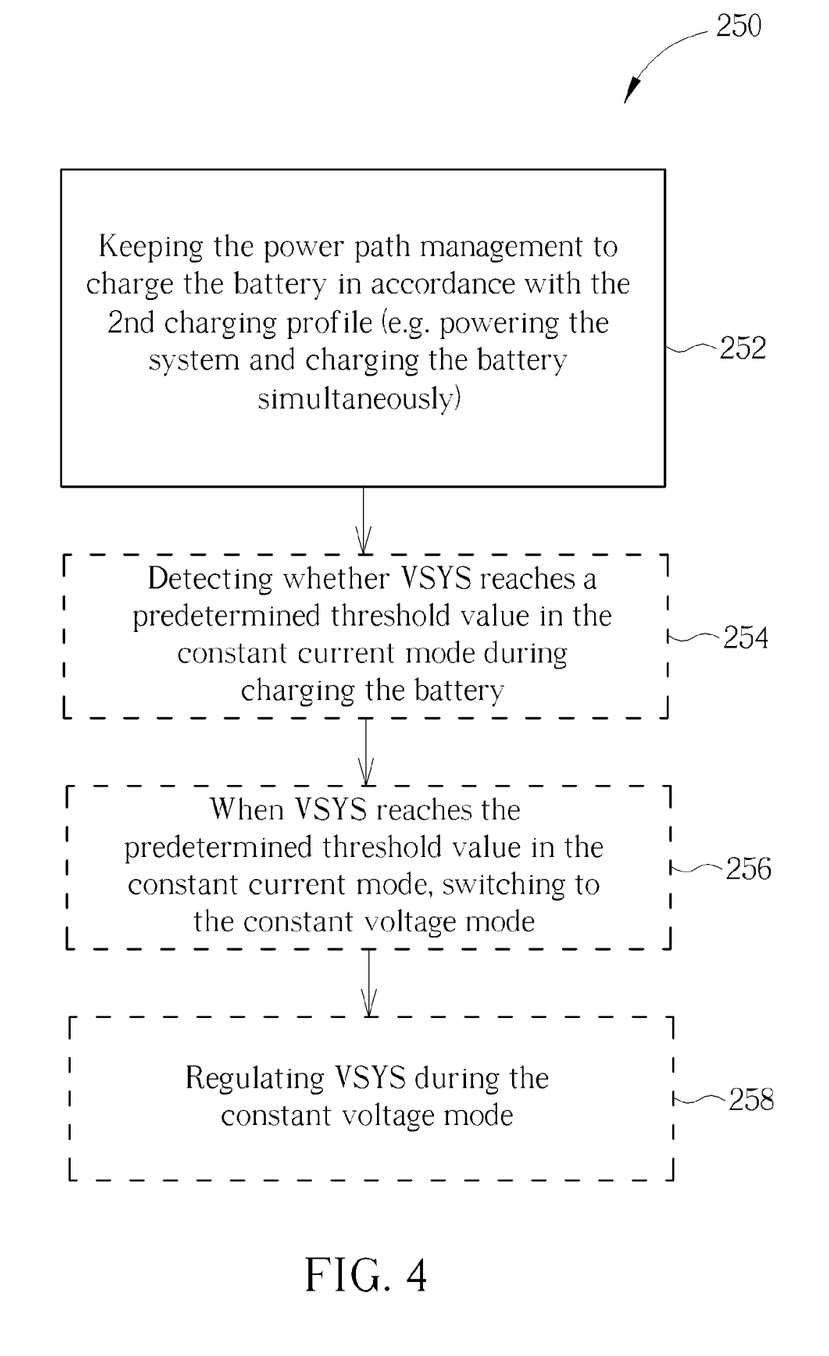
FIG. 4 illustrates a flowchart of a method for performing Step 250 shown in FIG. 2 according to an embodiment of the present invention.

FIG. 4 illustrates a flowchart of Step 250 shown in FIG. 2 according to an embodiment of the present invention. Since the external power source is capable of providing sufficient current to sustain the operation of the system of the electronic device, it can instantly enable the system and would not cause instability without the aid of the battery. Therefore, the charging profile proposed in this embodiment may power the system and charges the battery at the same time. The method is described as follows.

In Step 252, when the external power source does not belong to the predetermined type of power sources, the charger module 130 (more particularly, the controller 132) is capable of controlling the power path switching unit P_SW to make the electrical connection between the system within the electronic device and the battery 20 of the electronic device to have a second configuration, where the second configuration is typically different from the first configuration. In one embodiment, the second configuration corresponds to the conventional system instant-ON function and power path management. Under this configuration, the charger module 130 may utilize the power received from the external power source to power the system and charge the battery 20 simultaneously.

The controller 132 may further controls the monitoring circuit 120 to detect whether the voltage level VSYS of the system power signal reaches a predetermined threshold value Vth (e.g. 4.2 V) in the constant current mode during charging the battery 20 (Step 254). The multiplexer 122 of the monitoring circuit 120 may select and pass the system voltage VSYS to the comparator 124. In Step 256, when the comparator 124 detects that the voltage level VSYS reaches the predetermined threshold value Vth, the charger module 130 switches from the constant current mode to the constant voltage mode, and in Step 258, the charger module 130 regulates the voltage level VSYS to be at the predetermined threshold value Vth during the constant voltage mode for preventing the voltage level VSYS from exceeding the predetermined threshold value Vth during charging the battery 20. The predetermined threshold Vth represents a transition voltage level that the charger module 130 switches from the constant current mode to the constant voltage mode, and is generally depending on the battery characteristics. According to this embodiment, at the moment of switching from the constant current mode to the constant voltage mode, the system power signal output from the system terminal SYS of the charger module 130 is arranged to charge the battery 20 and to power the system simultaneously since the power path switching unit P_SW is turned on. In other words, the system power management method proposed in this embodiment detects and regulates the system voltage VSYS rather than the battery output voltage VBAT. As the power path switching unit P_SW contributes a voltage drop on the power path, the present method can effectively keep the power level at the system power terminal SYS under a safe region, thereby protecting the system coupled to the system power terminal SYS from overshooting.

FIG. 5 illustrates a predetermined charging profile involved with the method 200 shown in FIG. 2 and FIG. 4 according to an embodiment of the present invention. FIG. 6 illustrates a predetermined charging profile involved with the method 200 shown in FIG. 2 according to another embodiment of the present invention. In these embodiments, the notation Ich represents the charging current output from the charger module 130, and the notations A through to E represent different charging phases, respectively. For better comprehension of the characteristics of the respective partial curves of the charging phases A-E, the partial curves corresponding to different charging phases (e.g. multiple charging phases within the charging phases A-E) may be illustrated with different scales.

According to any of the predetermined charging profiles respectively shown in FIG. 5 and FIG. 6, the charger module 130 is capable of charging the battery 20 by controlling the voltage level VSYS and the charging current Ich. During the charging phase A, the system voltage VSYS is given a predetermined initial voltage level such as 3.7 V that is higher than the power-on voltage level required by the system. Therefore the system is enabled. The charger module 130 is capable of charging the battery 20 with a predetermined initial current level such as 100 mA (e.g. the charger module 130 controls the initial values of the voltage level VSYS and the charging current Ich to be 3.7 V and 100 mA, respectively) in a pre-charge mode to cause the output voltage level VBAT reach a specific voltage level such as 2.5 V. Note that the voltage/current levels given on the plot are for illustrative purpose only. For example, the pre-charging current may be given larger or smaller than 100 mA, and may not be fixed; it can be varied according to the characteristics/requirements of the battery. During the charging phase B, the charger module 130 is capable of charging the battery 20 with a predetermined high current level that is greater than the predetermined initial current level in the pre-charge mode, where the charger module 130 may keep the system in its turn-on status while the output voltage level VBAT is still relative low. During the charging phase C, the charger module 130 is capable of charging the battery 20 with the predetermined high current level in the constant current mode, where the voltage level VSYS may go higher to cause the output voltage level VBAT increase correspondingly, and the charger module 130 may keep the system in its turn-on status. During the charging phase D, the charger module 130 may continue charging the battery 20 in the constant voltage mode while the charging current Ich is decreasing, where the partial curves corresponding to the charging phase D may be different in these embodiments. During the charging phase E, the charging operation is completed, and the controller 132 can disable the power path by turning off the power path switching unit P_SW, where the charger module 130 can supply the system solely.

Regarding switching from the charging phase C to the charging phase D in the embodiment shown in FIG. 5, the charger module 130 may operate as mentioned in Step 254 to Step 258. When it is detected that the voltage level VSYS reaches the predetermined threshold value Vth (e.g. 4.2 V) in the constant current mode during charging the battery 20, the charger module 130 switches from the constant current mode to the constant voltage mode for preventing the voltage level VSYS from exceeding the predetermined threshold value Vth during charging the battery 20. Thus, the charger module 130 can regulate the voltage level VSYS (rather than the output voltage level VBAT) to prevent the voltage level VSYS from overshooting. As the charger module 130 regulates the voltage level VSYS at the predetermined threshold value Vth during the charging phase D, the diagram of FIG. 5 is labeled with the Regulate_VSYS mode.

Regarding switching from the charging phase C to the charging phase D in the embodiment shown in FIG. 6, the charger module 130 may operate as follows. When it is detected that the output voltage level VBAT reaches the predetermined threshold value Vth (e.g. 4.2 V) in the constant current mode during charging the battery 20, the charger module 130 switches from the constant current mode to the constant voltage mode for preventing the output voltage level VBAT from exceeding the predetermined threshold value Vth during charging the battery 20. As the charger module 130 regulates the output voltage level VBAT at the predetermined threshold value Vth during the charging phase D, the diagram of FIG. 6 is labeled with the Regulate_VBAT mode.

FIG. 7 illustrates a predetermined charging profile involved with the method 200 shown in FIG. 2 and FIG. 3 according to an embodiment of the present invention. FIG. 8 illustrates a predetermined charging profile involved with the method 200 shown in FIG. 2 according to another embodiment of the present invention. Similarly, the notation Ich still represents the charging current output from the charger module 130, and the notations A through to E represent different charging phases, respectively. For better comprehension of the characteristics of the respective partial curves of the charging phases A-E, the partial curves corresponding to different charging phases (e.g. multiple charging phases within the charging phases A-E) may be illustrated with different scales.

According to any of the predetermined charging profiles respectively shown in FIG. 7 and FIG. 8, the charger module 130 is capable of charging the battery 20 by controlling the voltage level VSYS and the charging current Ich. During the charging phase A, the voltage level VSYS is given a predetermined initial voltage level such as 2.5 V that is less than the power-on voltage level required by the system. Therefore, the system is not enabled. The charger module 130 is capable of charging the battery 20 with a predetermined initial current level such as 60 mA (e.g. the charger module 130 controls the initial values of the voltage level VSYS and the charging current Ich to be 2.5 V and 60 mA, respectively) in a pre-charge mode to cause the output voltage level VBAT reach a specific voltage level that is close to 2.5 V, where the system is typically in its turn-off status. Please note that the notation SYS_UVLO represents a power-on voltage level that is typically defined by a designer of the system, where the power-on voltage level SYS_UVLO can be regarded as a threshold for determining whether the system can be turned on. For example, the power-on voltage level SYS_UVLO may be defined to be 3.2 V. The voltage/current levels given on the plot are for illustrative purpose only. For example, the pre-charging current may be given larger or smaller than 60 mA, and may not be fixed; it can be varied according to the characteristics/requirements of the battery while complying with the USB charging specifications. During the charging phase C, the charger module 130 is capable of charging the battery 20 with the predetermined initial current level before the voltage level VSYS reaches the power-on voltage level SYS_UVLO. During the charging phase C, when it is detected that the voltage level VSYS reaches the power-on voltage level SYS_UVLO, the charger module 130 is capable of switching the charging current Ich from the predetermined initial current level to a predetermined high current level that is greater than the predetermined initial current level. During the charging phase D, the charger module 130 may continue charging the battery 20 while the charging current Ich is decreasing, where the partial curves corresponding to the charging phase D may be different in these embodiments. During the charging phase E, the charging operation is completed, and the controller 132 can disable the power path by turning off the power path switching unit P_SW, where the charger module 130 can supply the system solely.

Regarding switching from the charging phase C to the charging phase D in the embodiment shown in FIG. 7, the charger module 130 may operate as mentioned in Step 244 to Step 248. When it is detected that the voltage level VSYS reaches the predetermined threshold value Vth (e.g. 4.2 V) in the constant current mode during charging the battery 20, the charger module 130 switches from the constant current mode to the constant voltage mode for preventing the voltage level VSYS from exceeding the predetermined threshold value Vth during charging the battery 20. Thus, the charger module 130 can regulate the voltage level VSYS (rather than the output voltage level VBAT) to prevent the voltage level VSYS from overshooting. As the charger module 130 regulates the voltage level VSYS at the predetermined threshold value Vth during the charging phase D, the diagram of FIG. 7 is labeled with the Regulate_VSYS mode.

Regarding switching from the charging phase C to the charging phase D in the embodiment shown in FIG. 8, the charger module 130 may operate as follows. When it is detected that the output voltage level VBAT reaches the predetermined threshold value Vth (e.g. 4.2 V) in the constant current mode during charging the battery 20, the charger module 130 switches from the constant current mode to the constant voltage mode, for preventing the output voltage level VBAT from exceeding the predetermined threshold value Vth during charging the battery 20. As the charger module 130 regulates the output voltage level VBAT at the predetermined threshold value Vth during the charging phase D, the diagram of FIG. 8 is labeled with the Regulate_VBAT mode.

According to these embodiments, as the apparatus 100 can perform the charging port detection as soon as the connector of the external power source mentioned above is plugged into the USB connector. For example, it can be detected through the data terminals DP and DM, and in a situation where the charger module 130 complies with the USB BC 1.2 standard, the charging port information can be used directly. In a situation where the external power source mentioned above is a USB-complaint standard downstream port or a USB OTG device (e.g. Step 240 is entered, based upon the working flow of the method 200 shown in FIG. 2), the apparatus 100 can disable the system instant-on function. More particularly, when the output voltage level VBAT is too low to sustain the system, the controller 132 can always turn on the power path switching unit P_SW, where the charger module 130 may focus on charging the battery 20 during this period. As soon as the output voltage level VBAT is high enough, the system can be turned on and the charger module 130 can operate properly (more particularly, without introducing any side effect) since the system load and the charging current should not be a burden to the charger module 130 at this moment. If the system load is heavy (e.g. the current drawn by the system is greater than the input current limit), the voltage level VSYS will just drop slightly because the apparatus 100 may enter the battery supplement mode (in which both of the battery 20 and the charger module 130 can be utilized for providing the system with power) automatically and now the voltage level VBAT is high enough. In a situation where the external power source mentioned above is an AC-to-DC adaptor or a USB charger other than the above-mentioned USB-complaint standard downstream port or USB OTG device (e.g. Step 254 is entered, based upon the working flow of the method 200 shown in FIG. 2), the apparatus 100 can keep the system instant-on function while performing power path management. More particularly, the charger module 130 can obtain power from the AC-to-DC adaptor (or the charger) to output the system power signal at the system terminal SYS of the charger module 130, where the AC-to-DC adaptor/charger is capable of providing both of the system and the battery 20 with sufficient power through the charger module 130 at the same time. As a result, the charger module 130 is capable of charging the battery 20 and powering the system simultaneously.

It is an advantage of the present invention that the present invention method and apparatus can prevent unexpected system voltage drop (or unstable system voltage) when the external power source mentioned above has a weak charging capability (e.g. in a situation where the system circuit needs an input current level that is greater than 500 mA to sustain the system load and the external power source is a power source that provides insufficient current, such as a USB-complaint standard downstream port or a USB OTG device).

In addition, the present invention method and apparatus can meet the USB BC 1.2 standard while performing power path management when using an AC-to-DC adaptor for single input battery charger. Additionally, based upon the predetermined charging profiles respectively shown in FIG. 5 and FIG. 7, the present invention method and apparatus can prevent the system (e.g. a chipset) from being damaged by an overshoot waveform of the voltage level VSYS.

For purposes of distinguishing signal characteristics such as those respectively shown in FIGS. 5-8, when the voltage of a signal is kept constant in the beginning of a charging phase such as the charging phase D, the constant voltage of this signal in this charging phase can be regarded as the true constant voltage. In addition, when the voltage of a signal is kept constant in a non-beginning period of a charging phase such as the charging phase D, rather than being kept constant in the beginning of this charging phase, the constant voltage of this signal in this charging phase can be regarded as the non-true constant voltage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing system power management, the method being applied to an electronic device, the method comprising the steps of:
    performing charging port detection on a communication port of the electronic device, wherein the communication port obtains power from an external power source for the electronic device;
    determining a charging capability of the external power source from a first charging capability and a second charging capability, the second charging capability being weaker than the first charging capability;
    when it is detected that the external power source has the second charging capability, waiting to turn on a system within the electronic device until a voltage level of a battery of the electronic device reaches a predetermined voltage level;
    controlling a power path switching unit of the electronic device to charge the battery of the electronic device and detecting whether a voltage level of a system power at a system terminal coupling the system within the electronic device reaches a predetermined threshold value in a constant current mode during charging the battery, wherein the power path switching unit is arranged to control electrical connection between the system and the battery, and a charging current level in the constant current mode is determined according to the charging capability of the external power source; and
    when it is detected that the voltage level reaches the predetermined threshold value in the constant current mode during charging the battery, switching from the constant current mode to a constant voltage mode, wherein in a charging phase starting from a time point of switching from the constant current mode to the constant voltage mode, the voltage level is kept at a true constant voltage.

2. The method of claim 1, wherein the step of performing the charging port detection on the communication port further comprises:
    determining whether the external power source belongs to a predetermined type of power sources;
    wherein the power path switching unit is controlled according to whether the external power source belongs to the predetermined type of power sources.

3. The method of claim 2, wherein the step of controlling the power path switching unit further comprises:
    when it is detected that the external power source belongs to the predetermined type of power sources, turning on the power path switching unit to charge the battery in accordance with a predetermined charging profile corresponding to the predetermined type.

4. The method of claim 1, wherein at a moment of switching from the constant current mode to the constant voltage mode, the system power is arranged to charge the battery and to power the system simultaneously.

5. The method of claim 1, further comprising: regulating the voltage level of the system power during the constant voltage mode.

6. The method of claim 1, wherein the step of determining a charging capability of the external power source comprises determining a current level that the external power source is capable of providing.

7. An apparatus for performing system power management, the apparatus comprising at least one portion of an electronic device, the apparatus comprising:
    a charging port detection circuit arranged to perform charging port detection on a communication port of the electronic device, wherein the communication port obtains power from an external power source for the electronic device, and determine a charging capability of the external power source from a first charging capability and a second charging capability, the second charging capability being weaker than the first charging capability; and
    a charger module, electrically connected to the charging port detection circuit, wherein:
        when it is detected that the external power source has the second charging capability, the charger module waits to turn on a system within the electronic device until a voltage level of a battery of the electronic device reaches a predetermined voltage level,
        the charger module controls a power path switching unit of the electronic device to charge the battery of the electronic device, and
        the charger module detects whether a voltage level of a system power at a system terminal coupling the system within the electronic device reaches a predetermined threshold value in a constant current mode during charging the battery, wherein:
        the power path switching unit is arranged to control electrical connection between the system and the battery,
        a charging current level in the constant current mode is determined according to the charging capability of the external power source, and
        when it is detected that the voltage level reaches the predetermined threshold value in the constant current mode during charging the battery, the charger module switches from the constant current mode to a constant voltage mode, wherein in a charging phase starting from a time point of switching from the constant current mode to the constant voltage mode, the voltage level is kept at a true constant voltage.

8. The apparatus of claim 7, wherein the charging port detection circuit determines whether the external power source belongs to a predetermined type of power sources; and the charger module controls the power path switching unit according to whether the external power source belongs to the predetermined type of power sources.

9. The apparatus of claim 8, wherein when it is detected that the external power source belongs to the predetermined type of power sources, the charger module turns on the power path switching unit to charge the battery in accordance with a predetermined charging profile corresponding to the predetermined type.

10. The apparatus of claim 7, wherein at a moment of switching from the constant current mode to the constant voltage mode, the system power is arranged to charge the battery and to power the system simultaneously.

11. The apparatus of claim 7, wherein the charger module further regulates the voltage level of the system power during the constant voltage mode.

12. The apparatus of claim 7, wherein the charger module comprises:
   a controller arranged to control operations of the charger module; and a regulator arranged to generate the system power signal under control of the controller;
   wherein the apparatus further comprises:
   a monitoring circuit arranged to monitor the voltage level of the system power under control of the controller.

13. The apparatus of claim 7, wherein the charging port detection circuit is arranged to determine a current level that the external power source is capable of providing.

\* \* \* \* \*